United States Patent [19]
Kikinis et al.

[11] Patent Number: 5,805,902
[45] Date of Patent: Sep. 8, 1998

[54] STRUCTURE AND METHOD FOR ISSUING INTERRUPT REQUESTS AS ADDRESSES AND FOR DECODING THE ADDRESSES ISSUED AS INTERRUPT REQUESTS

[75] Inventors: Dan Kikinis, Saratoga; Pascal Dornier, Sunnyvale, both of Calif.

[73] Assignee: Elonex I.P. Holdings, Ltd., London, United Kingdom

[21] Appl. No.: 967,316

[22] Filed: Oct. 28, 1997

Related U.S. Application Data

[63] Continuation of Ser. No. 357,113, Dec. 16, 1994, abandoned, which is a continuation-in-part of Ser. No. 86,719, Jul. 2, 1993, abandoned.

[51] Int. Cl.$^6$ ............................. G06F 12/06; G06F 13/24; G06F 13/10
[52] U.S. Cl. ............................ 395/734; 395/741; 395/829
[58] Field of Search ................................... 395/734, 741, 395/738, 829; 364/DIG. 1, DIG. 2

[56] References Cited

U.S. PATENT DOCUMENTS

| | | | |
|---|---|---|---|
| 3,881,174 | 4/1975 | Barnich | 395/868 |
| 4,034,349 | 7/1977 | Monaco et al. | 395/868 |
| 4,626,634 | 12/1986 | Brahm et al | 379/28 |
| 4,709,324 | 11/1987 | Kloker | 395/375 |
| 4,930,068 | 5/1990 | Katayose et al. | 395/734 |
| 5,083,259 | 1/1992 | Maresh et al. | 395/306 |
| 5,448,744 | 9/1995 | Eifert et al. | 395/800 |

OTHER PUBLICATIONS

MCS—80/85 Family User's Manual; pp. 2–3, 2–4; Fig. 2–3; Intel Corporation, CA 1986.

*Primary Examiner*—Daniel H. Pan
*Attorney, Agent, or Firm*—Donald R. Boys

[57] ABSTRACT

An interrupt control circuit for use in a computer system has a CPU, a peripheral I/O device, and a bus having address lines for carrying signals to and from the peripheral I/O device. Interrupt requests generated by the I/O device are encoded as address signals which are transmitted on the address bus lines. A predetermined set of addresses are set aside to represent the interrupt requests. The interrupt control circuit is coupled to the address bus lines to receive the encoded interrupt requests. The interrupt control circuit has an address decoder which receives address signals from the I/O device. When these address signals represent an address within the predetermined set of addresses set aside to represent the interrupt requests, the address decoder uses the address signals to create a plurality of interrupt control signals. The interrupt control signals are provided to an interrupt latch/decoder which uses the interrupt control signals to create interrupt request signals. The interrupt request signals are provided to an interrupt controller. In response, the interrupt controller and the CPU process the interrupt request.

2 Claims, 8 Drawing Sheets

| BUS LINE NUMBER | SIIGNAL(S) CARRIED | |
| --- | --- | --- |
| 0 | D0 | BE0 |
| 1 | D1 | BE1 |
| 2 | D2 | A2 |
| 3 | D3 | A3 |
| 4 | D4 | A4 |
| 5 | D5 | A5 |
| 6 | D6 | A6 |
| 7 | D7 | A7 |
| 8 | D8 | A8 |
| 9 | D9 | A9 |
| 10 | D10 | A10 |
| 11 | D11 | A11 |
| 12 | D12 | A12 |
| 13 | D13 | A13 |
| 14 | D14 | A14 |
| 15 | D15 | A15 |
| 16 | D16 | A16 |
| 17 | D17 | A17 |
| 18 | D18 | A18 |
| 19 | D19 | A19 |
| 20 | D20 | A20 |
| 21 | D21 | A21 |
| 22 | D22 | A22 |
| 23 | D23 | A23 |
| 24 | D24 | A24 |
| 25 | D25 | A25 |
| 26 | D26 | A26 |
| 27 | D27 | A27 |
| 28 | D28 | A28 |
| 29 | D29 | A29 |
| 30 | D30 | A30 |
| 31 | D31 | A31 |
| 32 | BE2 | |
| 33 | BE3 | |
| 34 | Clk | |
| 35 | ADS | |
| 36 | LDEV # | |
| 37 | RDY # | |
| 38 | R/W # | |
| 39 | BREQ # | |
| 40 | BACK # | |
| 41 | RESET # | |

Fig. 3

| ADDRESS SPACE | DESIGNATION |
|---|---|
| FFFF 0000 - FFFF FFFF | BIOS ROM (RESET VECTOR) |
| FFFE 0000 - FFFE FFFF | I/O SPACE (64 KB) |
| FFFC 0000 - FFFD FFFF | MEMORY SPACE |
| FFF8 0000 - FFFB FFFF | INTERRUPT ADDRESSES |
| FFF8 0000 | IRQ0 |
| FFF8 0004 | IRQ1 |
| FFF8 0008 | IRQ2 |
| FFF8 000C | IRQ3 |
| FFF8 0010 | IRQ4 |
| FFF8 0014 | IRQ5 |
| FFF8 0018 | IRQ6 |
| FFF8 001C | IRQ7 |
| FFF8 0020 | IRQ8 |
| FFF8 0024 | IRQ9 |
| FFF8 0028 | IRQ10 |
| FFF8 002C | IRQ11 |
| FFF8 0030 | IRQ12 |
| FFF8 0034 | IRQ13 |
| FFF8 0038 | IRQ14 |
| FFF8 003C | IRQ15 |
| 0000 0000 - FFF7 FFFF | MEMORY SPACE |

Fig. 4A

NAME        PAL 411
DEVICE      G16V8MA ;

/ INPUTS/ pin 1  = ! wr ;        /* HCI read / !write */
pin 2  = ! ads ;       /* HCI address strobe */
pin 3  = ad18 ;        /* HCI address / data bus */
pin 4  = ad19 ;
pin 5  = ad20 ;
pin 6  = ad21 ;
pin 7  = ad22 ;
pin 8  = ad23 ;
pin 9  = ad24 ;
pin 11 = ad25 ;
pin 13 = ad26 ;
pin 14 = ad27 ;
pin 15 = ad28 ;
pin 16 = ad29 ;
pin 17 = ad30 ;
pin 18 = ad31;

pin 10 = gnd;
pin 20 = vcc;

/ OUTPUTS / pin 12 = !decode;      /* address decode */

/ EQUATIONS /

/* Address decode, active for one cycle after ADS */ decode = ads & wr & ad31 & ad30 & ad29 & ad28 & ad27 & ad26 & ad25 & ad24 &
         ad23 & ad22 & ad21 & ad20 & ad19 & !ad18;

Fig. 4D

```
NAME    PAL 412      DEVICE  P18CV8
/** INPUTS **/
pin 1   = clk;          /* HCI clock */
pin 2   = !ads;         /* HCI address strobe */
pin 3   = !decode;      /* Address decode from PAL1 */
pin 4   = ad2;          /* HCI address / data bus */
pin 5   = ad3;
pin 6   = ad4;
pin 7   = ad5;
pin 8   = !reset;       /* Bus reset */ pin 10  = gnd:
pin 11  = !oe;          /* output enable = GND */
pin 20  = vcc;

/** OUTPUTS **/
pin 12  = la2;          /* Latched address */
pin 13  = la3;
pin 14  = la4;
pin 15  = la5;
pin 16  = !wr1;         /* Write strobe to low interrupt latch */
pin 17  = !wr2;         /* Write strobe to high interrupt latch */
pin 18  = !rdy;         /* HCI ready */
pin 19  = !dec;         /* HCI device decode */

/** EQUATIONS **/
la2.d   = la2 & !ads  # ad2 & ads;
la3.d   = la3 & !ads  # ad3 & ads;
la4.d   = la4 & !ads  # ad4 & ads;
la5.d   = la5 & !ads  # ad5 & ads;

dec.d   = decode & !reset;
        # dec & !rdy & !reset;
dec.oe  = dec;

rdy.d   = { wr1 # wr2 } & !rdy & !reset;
rdy.oe  = dec;

wr1.d   = !la5 & dec & !wr1 & !rdy & !reset;
wr2.d   =  la5 & dec & !wr2 & !rdy & !reset;

la2.ar  = 'b'o; la2.sp = 'b'o;
la3.ar  = 'b'o; la3.sp = 'b'o;
la4.ar  = 'b'o; la4.sp = 'b'o;
la5.ar  = 'b'o; la5.sp = 'b'o;
dec.ar  = 'b'o; dec.sp = 'b'o;
rdy.ar  = 'b'o; rdy.sp = 'b'o;
wr1.ar  = 'b'o; wr1.sp = 'b'o;
wr2.ar  = 'b'o; wr2.sp = 'b'o;
```

Fig. 4E

STRUCTURE AND METHOD FOR ISSUING INTERRUPT REQUESTS AS ADDRESSES AND FOR DECODING THE ADDRESSES ISSUED AS INTERRUPT REQUESTS

CROSS-REFERENCES TO RELATED APPLICATIONS

This application is a continuation of U.S. patent application Ser. No. 08/357,113, now abandoned, filed Dec. 16, 1994, which is a continuation-in-part of application Ser. No. 08/086,719, filed Jul. 2, 1993 now abandoned. The prior applications are incorporated herein in their entirety by reference.

FIELD OF THE INVENTION

The present invention relates generally to a high-speed computer bus system, and in particular to a method and structure for processing interrupt requests using the computer bus system.

BACKGROUND OF THE INVENTION

The main component of a typical personal computer (PC) is the motherboard, or a large circuit board that holds the central processing unit (CPU), such as an Intel 80486, random access memory (RAM), control chips, and buffer chips. Expansion slots, which are elongated electrical connectors, on the motherboard accept peripheral devices such as video controller boards or cards, I/O cards, hard/floppy drive controller cards, network adapters, modems, and so forth. These cards usually control other devices such as monitors, hard and floppy drives, scanners, and more.

A bus structure handles the communication between the separate chips and peripherals. This bus structure includes individual conductive traces (signal paths) on the circuit boards that link the individual components, control chips for controlling the transfer of the signals, and connectors for plugging in the various expansion cards on the motherboard.

In a computer capable of addressing memory with 32-bit addresses and transferring data with 32-bit word lengths, 64 traces are typically needed for the address bus and the data bus alone, because the two are usually kept separate. However, many additional paths are needed for other functions, such as I/O cycles and interrupt requests. The IBM-compatible ISA (Industry Standard Architecture) bus has 96 signals, each with a dedicated trace. The large number of traces makes the layouts on the motherboard and peripherals very complicated and expensive.

In some general-purpose computer architectures, such as DEC's Turbochannel bus, the address and data buses are combined into a single bus. The address and data signals are multiplexed, or alternated, so that they can both be carried on the same group of 32 signal paths. By multiplexing the address and data buses, the pin numbers on ICs and motherboard layout congestion are greatly reduced. The reduced congestion allows shorter signal paths, so that signal delays are also reduced. The reduction in the size and complexity of many components provides savings in cost.

It is known that any reduction that can be made in the number of lines in a compressed bus translates typically to reduced hardware complexity and cost. Consequently, efforts are being made by developers to further reduce the number of conductors.

One way known to the inventors to accomplish such reduction is to multiplex control signals on the lines generally dedicated to address and data signals. For example, since most bus architectures have a dedicated line for interrupt requests, which line carries signals initiated by peripheral devices to interrupt the CPU, hardware complexity could be further reduced by multiplexing interrupt request signals somehow on the address and data lines, and eliminating the line or lines typically dedicated to interrupt requests.

One developed system that has no dedicated interrupt request lines is the PCI™ local bus system introduced by Intel Corporation. For the PCI bus, Intel has also introduced a legacy connector for connecting peripherals to the PCI bus and interrupt circuitry, so interrupt requests may be properly processed. Full details of the Legacy connector and the PCI bus system are available from Intel Corporation.

Another bus system with no dedicated interrupt line is the HCI bus system disclosed in the parent patent application to this application, listed in the "Cross References to Related Documents" section above. In the HCI system, interrupt requests are multiplexed on the lines for data and address signals, and no Legacy connector is needed. Details of a hardware system useful in conjunction with the previously disclosed HCI bus are presented and claimed herein.

SUMMARY OF THE INVENTION

In accordance with the present invention, an interrupt control circuit is provided for use in a computer system which has a CPU, a peripheral I/O device, and a bus having address lines for carrying address signals to and from the peripheral I/O device. Interrupt requests generated by the I/O device are encoded as address signals which are transmitted on the address bus lines. A predetermined set of addresses are set aside to represent interrupt requests. The interrupt control circuit is coupled to the address bus lines to receive the encoded interrupt requests. In one embodiment, the address bus lines carry multiplexed address and data signals.

The interrupt control circuit has an address decoder which receives address signals from the I/O device. When these address signals indicate an address within the predetermined set of addresses set aside to represent interrupt requests, the address decoder uses these address signals to generate encoded interrupt control signals.

The encoded interrupt control signals are provided to an interrupt latch/decoder of the interrupt control circuit. The interrupt latch/decoder decodes the encoded interrupt control signals to create interrupt request signals. The interrupt request signals are provided to an interrupt controller of the interrupt control circuit. In response, the interrupt controller and the CPU process the interrupt request.

Because the address lines of the bus are used to transmit the interrupt requests, a separate legacy connector for PCI systems is not required to transmit interrupt requests between the I/O device and the CPU.

In one embodiment, the address decoder includes a first address decoder coupled to the bus. The first address decoder asserts a DECODE output signal when the address signals on the bus indicate an address within the predetermined set of addresses. The address decoder also includes a second address decoder which is coupled to the bus and the first address decoder. The second address decoder creates the encoded interrupt control signals when the DECODE output signal is asserted.

Also in accordance with the invention is a method of generating interrupt requests in response to signals transmitted from a peripheral I/O device on a bus having a plurality of address lines. This method includes the steps of (1) transmitting a plurality of address signals from a peripheral I/O device to an address decoder on a plurality of address bus lines, (2) decoding the address signals with the address decoder to determine when the address signals indicate an address which is within a predetermined set of addresses set aside for interrupt requests, (3) creating a plurality of encoded interrupt control signals from the address signals when the address signals indicate an address which is within the predetermined set, (4) decoding the encoded interrupt control signals, thereby creating interrupt request signals, and (5) performing an interrupt sequence in response to the interrupt request signals.

In this method, the interrupt requests are effectively transmitted from the peripheral I/O device to an interrupt controller on the address lines of the bus, thereby eliminating the need for a dedicated interrupt line or for separate connector from a peripheral device to the interrupt control circuitry, such as the Legacy connector described above.

BRIEF DESCRIPTION OF THE DRAWINGS

FIG. 3 is a pin-out listing of the bus structure used in the system of FIG. 1;

FIG. 4A illustrates a memory mapping scheme for a general-purpose computer according to an embodiment of the present invention;

FIG. 4D provided definition for PAL 411 of FIG. 4C; and

FIG. 4E provides definition for PAL 412 of FIG. 4C.

DESCRIPTION OF THE PREFERRED EMBODIMENTS

Figure 1:
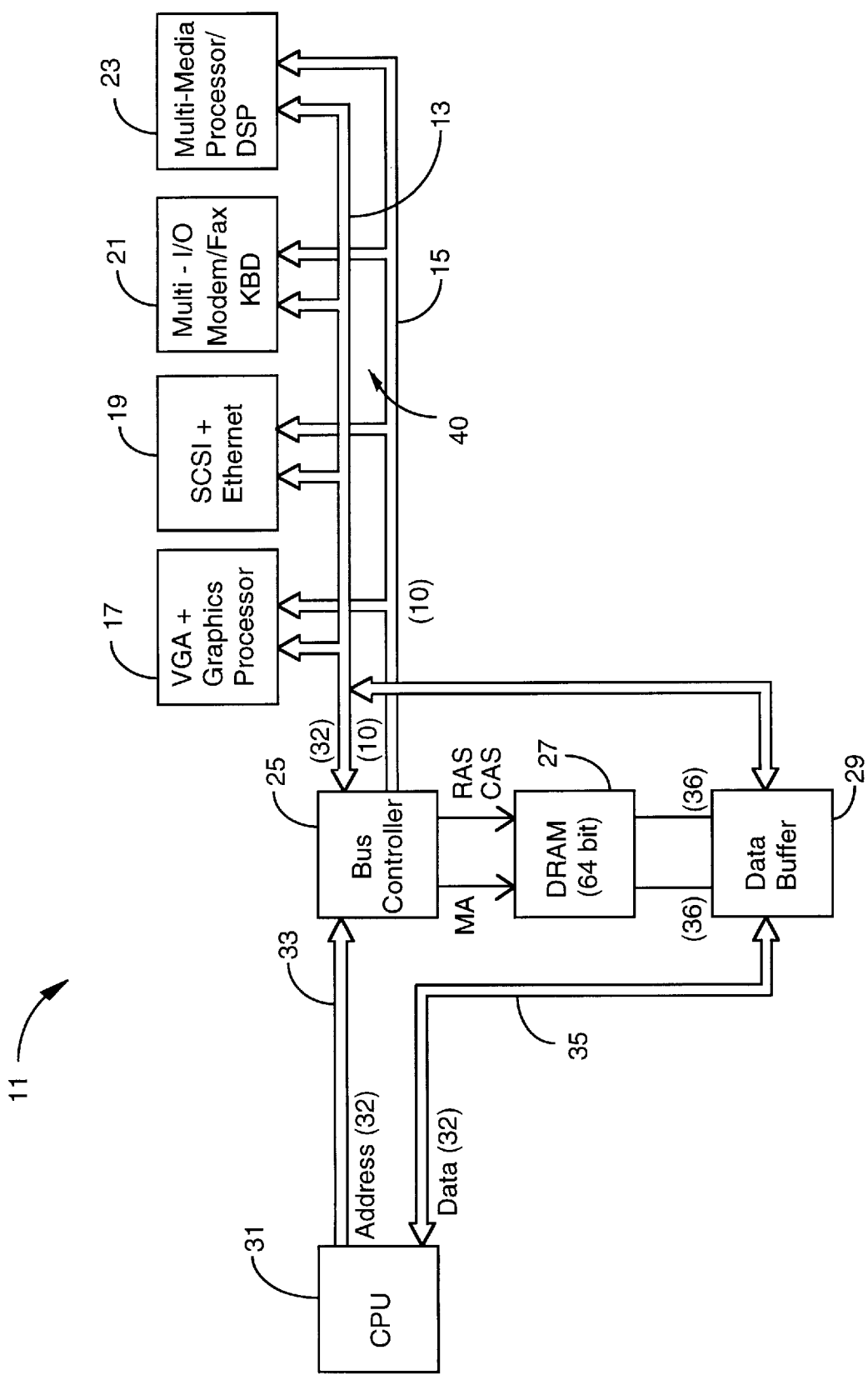
FIG. 1 is a block diagram illustrating a computer architecture according to one embodiment of the invention.

FIG. 1 is a simplified block diagram of a computer architecture 11 according to the present invention. Paths 13 and 15 together represent an optimized High-Speed CPU Interconnect Bus called the HCI Bus by the inventors. The computer architecture based on the HCI bus is hereinafter the HCI architecture. It can be applied to PCs, Macs, workstations, as well as other types of computers, and is especially useful for portable computers such as notebook and palmtop computers.

Path 13 has 32 traces, and represents a multiplexed, address-and-data combination bus capable of conveying both 32 bit addresses and 32 bit data words. Path 15 has 10 traces in a preferred embodiment for control signals further detailed below. The two paths together comprise HCI Bus 40, a total of 42 traces, a considerably smaller number than most conventional bus structures, even for multiplexed bus structures. The reduction in the number of traces results in less layout congestion, and consequently, shortened traces. The shortened traces in turn reduce signal delays, so that the computer's performance is increased.

Peripheral I/O or expansion devices for the HCI computer architecture are represented by devices 17, 19, 21, and 23. They are shown coupled to HCI bus 40, preferably through expansion slots or connectors (not shown). VGA and Graphics processor card 17 includes high-speed video memory, and is responsible for displaying information on a connected monitor. Small Computer System Interface (SCSI) and Ethernet interface card 19 provides coupling to various SCSI equipment, such as CD-ROM drives and tape backups, and to Ethernet local area networks. Multi-I/O card 21 is an interface for hard disks, floppy drives, fax/modems, keyboards, etc. Multi-media processor/DSP (digital signal processor) card 23 is a high-speed processor for audio and video signals, and can typically drive external speakers or audio amplifiers. Many other types of peripheral devices can be connected to HCI bus 40. Similar devices are widely available for most existing computer architectures. Suitable and relatively simple modifications can be made to make them compatible with HCI bus 40. The reduced number of traces in HCI bus 40 in turn allows a reduced number of traces and connection contact pads in the peripheral devices.

Other than the peripheral interfaces, the basic computer in the HCI architecture is implemented in the embodiment described by reference to FIG. 1 in just four ICs. A system control chip 25 controls the bus, and contains the system clock (not shown). System memory 27 is high-speed, low-power, dynamic random access memory (DRAM). It communicates with the system controller through multiplexed addressing (MA) of standard rows address signals (RAS) and column address signals (CAS). 64-bit memory is used for optimized performance, although 32-bit memory can also be used. Data buffer 29 is the only buffer required in the system, because the bus can be driven by low power CMOS (complimentary metal-oxide semiconductor) outputs.

As an example specific to the buffer requirement, a conventional ISA bus is designed to support a TTL definition that is over a decade old. It requires a driving current of about 24 mA multiplied by about 80 active signals, which amounts to about 1.6 amperes, as described above. This large load requires, in most implementations, as many as twenty small buffer chips, or four or five large ones. The overhead incurred in terms of bus length, heat, radio frequency interference, complexity, and so forth, is quite large. In contrast, the HCI architecture illustrated has virtually no DC loading and operates at about 10 mA per trace, multiplied by about 42 active traces switching at the same speed as most CPUs; from about 16 to 33 MHz. As a result, only a single buffer is required for HCI bus 40.

Computation and logic processes in the HCI architecture, as in other architectures, is handled by a CPU 31. CPU 31 is coupled to system controller 25 by a short 32-bit address bus 33, and to data buffer 29 by a short 32-bit data bus 35. Data is transferred between buffer 29 and DRAM 27 through short but separate address and data buses. Each of these buses has 36 signal paths, 32 of which are for address or data, and 4 are for control in the embodiment shown. Line 32 between CPU 31 and system controller 25 indicates control lines, such as interrupt request and acknowledge lines, in an embodiment wherein an interrupt controller is implemented as a part of system controller 25. In some embodiments there may also be connection from data bus 35 to the system controller.

A significant feature of the HCI architecture is that it may be configured to support a large number of CPUs. Multiplexed buses have been designed in the past, such as the DEC TurboChannel, but these designs are compatible with only a single type of CPU or a single class of CPUs made by a particular manufacturer. In the HCI architecture, the CPU can be virtually any of the many available high-end microprocessors, such as the Intel 80486 and Pentium, DEC Alpha, Motorola 680x0, Sun SPARCs, and many others.

This important advantage of multi-CPU compatibility, or CPU independence, is provided by system controller 25. This chip has a programmable state machine for translating between the state dynamics of a variety of supported CPUs and the state dynamics of HCI bus 40. The programming can be done in a variety of ways, including EPROM, mask, RAM, etc. In one embodiment, auto-programming is used. In the case of auto-programming, system controller 25 will automatically recognize CPU 31 by reading the state, either pull-up or pull-down, of the CPU's output lines. The pattern of these outputs is compared to a database of the patterns of known CPUs until a match is found. System controller 25 then uses the proper protocols to translate between the CPU and the HCI bus architecture.

In different embodiments of the invention, different types of programmability will be preferable. For example, on a motherboard designed to work with a variety of CPUs, an auto-programmable system controller will be preferred. In most cases, the HCI architecture will be designed to work with a single type of CPU, so that it is unnecessary to change the setting. In these cases, mask programming is most cost effective.

Another feature of the HCI architecture is support for a high-speed master mode, programmed in the system controller chip. Each type of processor has its own algorithm for burst data transmission. In setting up the generic system controller to be compatible with a particular CPU, the system controller's master mode is set to be initiated and operated by the burst algorithm of the processor used.

Data transfer mechanisms of the architecture are CPU write to HCI, CPU read from HCI, HCI write to main memory, and HCI read from main memory.

Figure 2:
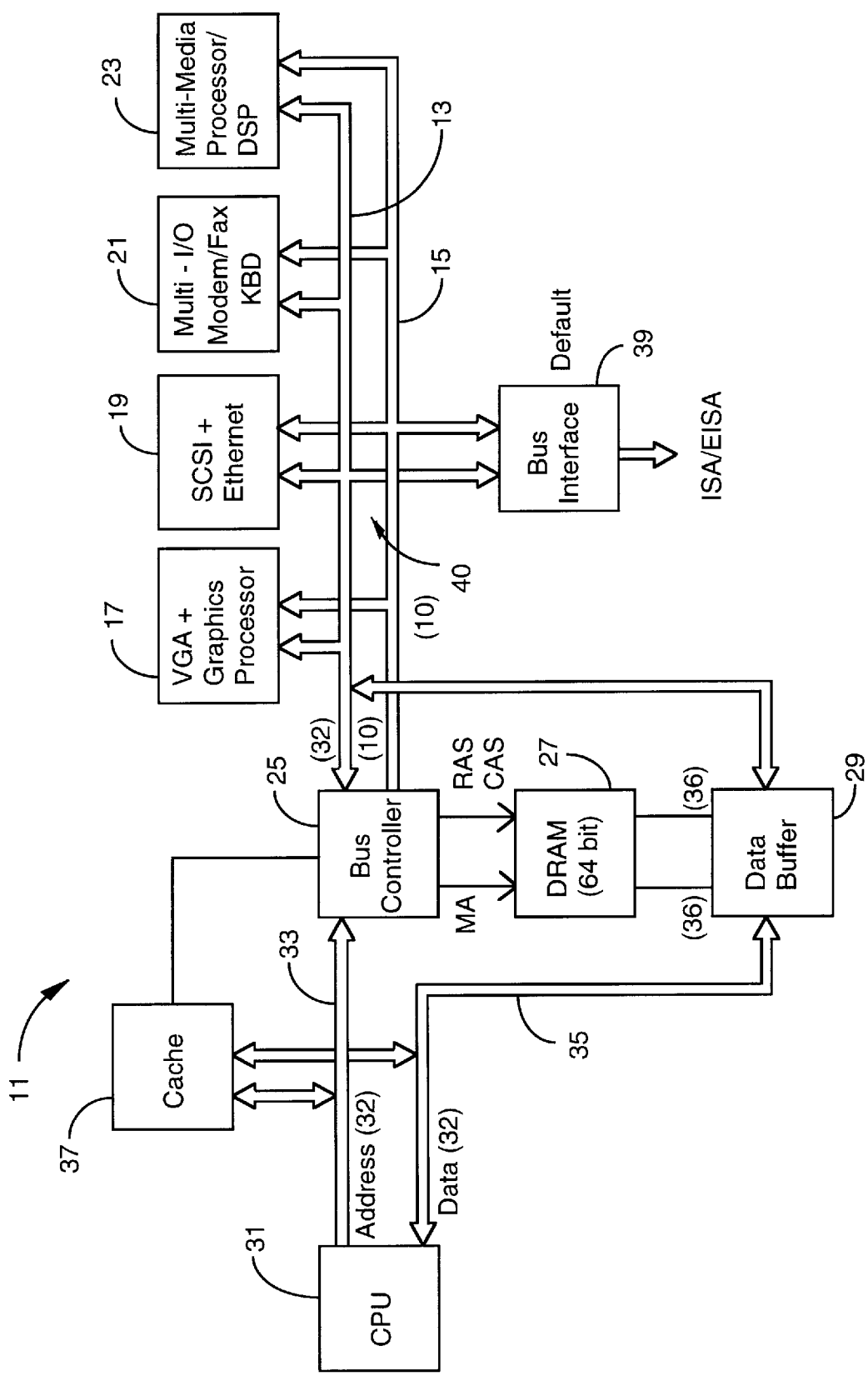
FIG. 2 is a block diagram illustrating a computer architecture as shown in FIG. 1, further comprising an optional interface to conventional buses and a cache system.

FIG. 2 shows an alternative embodiment of the HCI architecture, comprising the architecture of FIG. 1 with additional, optional components. To increase performance, high-speed cache memory 37 can be coupled to the CPU address and data buses 33, 35. Cache memory 37 is controlled by system controller 25. Cache memory 37 need not be specifically designed to be compatible with HCI state dynamics, because it couples to the CPU bus instead of HCI bus 40.

Another option is a bus interface 39 for coupling HCI bus 40 to other bus structures, such as ISA, EISA, Microchannel, etc. Bus interface 39 comprises an IC designed to convert between the state dynamics of HCI bus 40 and the dynamics of the bus to which the HCI bus 40 is to be coupled. For example, when a device on an ISA bus issues an interrupt, the devices on HCI bus 40 will not answer. In this case, bus interface 39 will become the default device which answers the interrupt.

FIG. 3 lists the signals present on the 42 lines of HCI bus 40 in one embodiment. The bus line numbers 0–41 in the left column are for reference only, and do not imply that these bus lines could not be in another order. Bus lines 0–31 are the multiplexed data/address lines and bus lines 32–41 are the control lines. The signals listed in FIG. 3 are described in more detail below. A "#" symbol after a signal (e.g., RDY#) indicates that the signal is active low.

| | |
|---|---|
| D0–D31 | Data signals. Data signals D0–D31 are multiplexed with address signals A2–A31 and byte enable signals BE1–BE2. |
| A2–A31 | Address signals. |
| BE1–BE4 | Byte enable signals. |
| CLK | Bus clock signal. |

-continued

| | |
|---|---|
| ADS# | Address strobe signal. The ADS# signal is used to start a cycle, and to indicate the burst length. The ADS# signal is low for one cycle for single word transfers. For burst transfers, the ADS# signal will remain low until the RDY# signal is asserted before the last word of the burst transfer. |
| LDEV# | Device decode signal. The LDEV# signal is used to indicate that a device is clamping a cycle. If no device pulls this bus line low, the cycle will go to the default device, such as ISA bus interface 39. The LDEV# signal is necessary for zero wait-state write support. |
| RDY# | Ready signal. A low RDY# signal indicates that valid read data is on the bus, or that a write word has been accepted. |
| R/W# | Read/Write signal. The R/W# signal is driven simultaneously with the address signals A2–A31. |
| BREQ# | Bus request signal. A bus-mastering peripheral I/O device pulls the BREQ# signal low to request bus ownership. The BREQ# signal is specific to each peripheral I/O device. |
| BACK# | Bus acknowledge or grant signal. The BACK# signal goes low when bus ownership is granted. The BACK# signal is specific to each peripheral I/O device. |
| RESET# | System reset signal. The system is reset when the RESET# signal goes low. |

In conventional bus structures specific and dedicated conductive traces are provided for I/O signals and interrupt requests. An interrupt controller (typically a separate IC) receives the interrupt requests and triggers an interrupt in the CPU. This is a significant source of layout congestion in conventional prior art architectures.

In HCI bus 40, instead of issuing interrupts on dedicated paths, interrupt requests are transmitted on HCI bus 40. To accomplish this, in a preferred embodiment, a predetermined set of addresses are selected and reserved to represent the interrupt requests.

FIG. 4A illustrates the address space allocation for one embodiment of the invention. In this embodiment, the address space from FFF8 0000 - FFFB FFFF is set aside for interrupt requests. Sixteen interrupt requests (IRQ0–IRQ15) are defined within this address space. For example, address space FFF8 000C is set aside for interrupt request IRQ3. The remaining address space is designated as follows. The address space from 0000 0000 - FFF7 FFFF and from FFFC 0000 - FFFD FFFF is set aside for memory space, the address space from FFFE 0000 - FFFE FFFF is set aside for I/O space, and the address space from FFFF 0000 - FFFF FFFF is set aside for BIOS ROM.

Figure 4B:
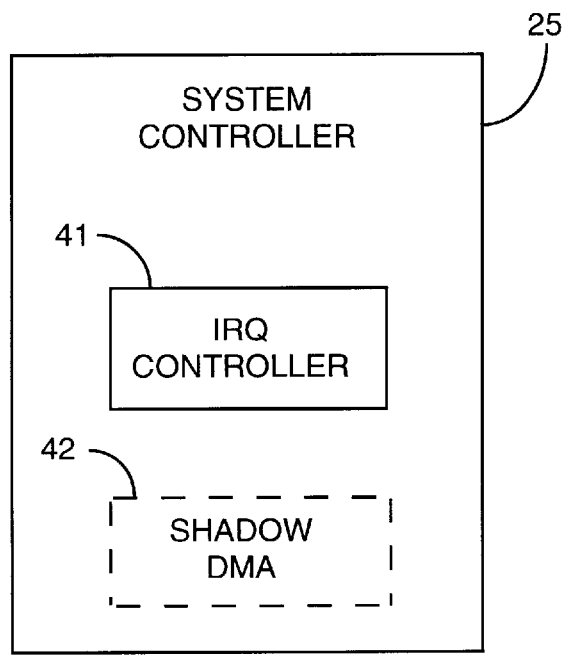
FIG. 4B illustrates a bus controller incorporating an interrupt controller and a shadow DMA controller according to an embodiment of the invention.

As illustrated in FIG. 4B, instead of using a separate IC for processing interrupt requests, an interrupt control circuit 41 can be part of the same chip as system controller 25. As described in more detail below, interrupt control circuit 41 is coupled to HCI bus 40. Interrupt control circuit 41 monitors addresses on HCI bus 40 to detect an address representative of an interrupt request. When the address on HCI bus 40 is representative of an interrupt request, interrupt control circuit 41 generates the appropriate interrupt request signals and transmits these signals to CPU 31. As a result, many paths and pins are saved.

Figure 4C:
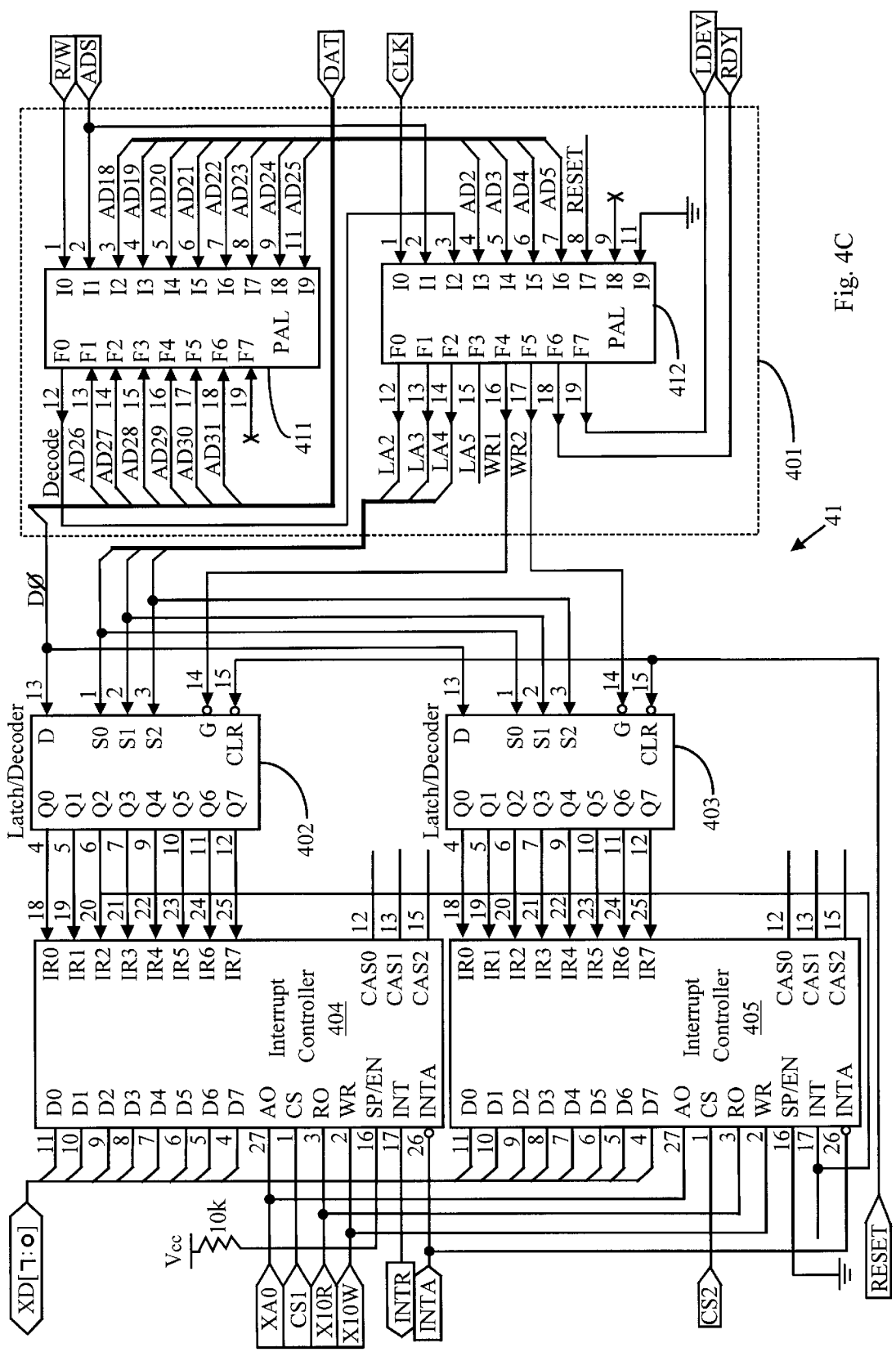
FIG. 4C is a schematic diagram of one embodiment of the interrupt controller of FIG. 4B.

FIG. 4C is a schematic diagram of one embodiment of interrupt control circuit 41, wherein the functions of the interrupt control circuitry are illustrated as implemented with discrete IC components. In this description, applicant emphasizes that the circuitry thus illustrated may also be integrated in a single IC, as in system controller IC 25, as described above. The circuitry could also be implemented as entirely separate from system controller 25 and connected separately to the address, data, and control signals, and to the CPU separately from the connections to system controller 25. Those with skill in the art will recognize that there are many ways the implementation may be accomplished.

In the exemplary implementation of FIG. 4C interrupt control circuit 41 includes address decoder 401, interrupt latch/decoders 402 and 403 and interrupt controller chips 404 and 405. Address decoder 401 includes programmable array logic devices (PALs) 411 and 412.

To generate an interrupt request in the example circuit of FIG. 4C, one of I/O peripheral devices 17, 19, 21 or 23 (FIG. 1) transmits an address representing the desired interrupt request to interrupt control circuit 41 on the data/address lines of HCI bus 40. For example, to generate interrupt request IRQ3, graphics processor 17 would transmit address FFF8 000C to address decoder 401 of interrupt control circuit 41 (see also FIG. 4A). In addition to this address, the I/O peripheral device must also transmit logic low R/W# and ADS# signals on HCI bus 40. The low R/W# signal indicates the peripheral I/O device is in the write mode and the low ADS# signal indicates the peripheral I/O device is transmitting an address signal.

PAL 411 receives address signals A31–A18. From these address signals, PAL 411 determines whether the address transmitted on HCI bus 40 falls within the address space set aside for the interrupt requests (e.g., FFF8 0000 - FFFB FFFF). Specifically, the address transmitted on HCI bus 40 falls within this address space if address signals A31–A20 and A18 are logic high and address signal A19 is logic low.

When the address transmitted on HCI bus 40 is within the set of addresses set aside for interrupt requests and the R/W# and ADS# signals are asserted low, PAL 411 generates a DECODE signal. This DECODE signal is an active low signal which is transmitted to PAL 412.

PAL 412 also receives the ADS# signal and address signals A5–A2 from the address/data lines of HCI bus 40. Address signals A5–A2 are four bits which define up to sixteen interrupt requests (e.g., IRQ0–IRQ15). The low ADS# signal causes address signals A5–A2 to be latched into output latches located within PAL 412 as encoded interrupt control signals LA5–LA2, respectively. PAL 411 and PAL 412 are defined in FIGS. 4D and 4E, respectively. Device specifications are available from various manufacturers who make PALS, as will be apparent to those with skill in the art. Device numbers are given on each of FIG. 4D and 4E.

Interrupt control signals LA5–LA2 are used to control interrupt latch/decoders 402 and 403. Thus, interrupt control signals LA2–LA4 are provided to input terminals S0–S2 of interrupt latch/decoders 402 and 403. Interrupt control signal LA5 is used internally within PAL 412 to generate interrupt latch/decoder write enable signals WR1 and WR2. Write enable signals WR1 and WR2 are used to enable interrupt latch/decoders 402 and 403, respectively. Write enable signal WR1 enables interrupt latch/decoder 402 for one cycle after the DECODE signal is asserted low if interrupt control signal LA5 is low (i.e., during interrupt requests IRQ0–IRQ7). Write enable signal WR2 enables latch/decoder 403 for one cycle after the DECODE signal is asserted low if interrupt control signal LA5 is high (i.e., during interrupt requests IRQ8–IRQ15).

When enabled, interrupt latch/decoders 402 and 403 decode the interrupt control signals LA4–LA2 provided at input terminals S2–S0. More specifically, interrupt latch/decoders operate as 3-to-8 decoders which generate one of eight interrupt request signals on output terminals Q0–Q7 in response to interrupt control signals LA4–LA2. In this manner, the particular interrupt requests IRQ0–IRQ15 (FIG. 4A) are identified by interrupt latch/decoders 402 and 403.

For example, when a peripheral I/O device transmits interrupt request IRQ3 (i.e., FFF8 000C), interrupt latch/decoder 402 is enabled by write control signal WR1 and the signals "0", "1", and "1" are provided to input terminals S2, S1 and S0, respectively. In response, an interrupt request signal is asserted at the Q3 output terminal of interrupt latch/decoder 402. This interrupt request signal remains latched at the Q3 output terminal until reset or overwritten.

The polarity (i.e., "0" or "1") of the interrupt request signals asserted at the output terminals of interrupt latch/decoders 402 and 403 is selected by a data signal D0. Data signal D0 is transmitted from the peripheral I/O device to the interrupt latch/decoders 402 and 403 during the time that the interrupt latch/decoders 402 and 403 are enabled (i.e., during the cycle after the interrupt request is received from the peripheral I/O device).

The interrupt request signals generated by interrupt latch/decoders 402 and 403 are transmitted to conventional interrupt controllers 404 and 405, respectively. In response, interrupt controller 404 or 405 transmits an interrupt (INTR) signal to CPU 31. CPU 31 responds by transmitting an interrupt acknowledge (INTA) signal to interrupt controller 404 or 405. In response to the INTA signal, interrupt controller 404 or 405 releases a call instruction code onto lines XD[7:0] of CPU data bus 35 (FIG. 1). The call instruction code causes additional INTA signals to be transmitted from CPU 31 to interrupt controller 404 or 405. These additional INTA signals allow the interrupt controller 404 or 405 to release the preprogrammed subroutine address onto lines XD[7:0] of CPU data bus 35. Interrupt controllers 404 and 405 are available from Intel Corp. as Part No. 8259A.

The remaining connections to interrupt controllers 404 and 405 are conventional connections which are typically used in a CPU bus system which includes address bus 33 and data bus 35 (FIG. 1).

To transmit I/O signals from CPU 31 to the peripheral I/O devices connected to HCI bus 40, bus controller 25 maps these I/O signals into 64 KByte I/O space FFFE 0000 - FFFE FFFF (See, FIG. 4A). I/O signals generated by CPU 31 typically have an upper 16-bits which are undefined and a lower 16 bits which define the I/O address. Bus controller 25 replaces the undefined upper 16 bits with the 16-bit word FFFE and passes the lower 16 bits (i.e., the I/O address) unchanged. The peripheral devices connected to HCI bus 40 decode the upper 16 bits to determine when these upper 16 bits are equal to FFFE. When the peripheral devices determine that the upper 16 bits are equal to FFFE, the peripheral devices interpret the lower 16 bits as an I/O address.

The mapping of I/O signals into I/O space FFFE 0000 - FFFE FFFF eliminates the need to transmit the I/O signals to the peripheral devices on a dedicated path. The Intel CPU architecture has a separate I/O address space that can be accessed only by special instruction, such as IN, OUT, INS, and OUTS. Moreover, the ability to map I/O signals allows HCI-compatible devices to be used with CPUs that do not have a separate I/O space.

Direct memory access (DMA) is not supported in HCI bus 40. However, a "shadow" DMA controller 42, as shown in FIG. 4B can be implemented using registers in system controller 25 to mimic an actual DMA controller.

Additional information concerning the operation and performance of HCI bus 40 is set forth in U.S. patent application Ser. No. 08/086,719, filed Jul. 2, 1993, which as mentioned above, is incorporated herein by reference in its entirety.

Although the present invention has been described in connection with several embodiments, it is understood that this invention is not limited to the embodiments disclosed, but is capable of various modifications which would be apparent to one of ordinary skill in the art in light of the present disclosure. For example, the hardware implementation for interrupt control illustrated and described with reference to FIGS. 4C, 4D, and 4E, is exemplary, and, as mentioned above, the functions of the discrete devices shown in FIG. 4C and described above could be provided by a very large variety of combinations of discrete devices, and also by various implementations in silicon in combination with other functionality. One such implementation would be integration with the functions of system controller 25 into a single ASIC, as suggested above.

Further, the diagrams in the present disclosure have been kept simple to facilitate understanding of the invention, as inclusion of all the connections and elements in such a computer would certainly obfuscate the issues. So, it is emphasized that, just because some specific conventional connection or function is not shown, does not mean that it is meant to be excluded. Such connections and elements will be well within the ability of those with skill in the art to implement in conjunction with the more detailed descriptions of the inventive portions of the present disclosure.

What is claimed is:

1. A method for issuing and processing interrupt requests in a computer having a central processing unit (CPU) and peripheral I/O devices comprising steps of:

(a) reserving a set of addresses in the address space of the computer, individual ones of the reserved addresses representing individual ones of the peripheral devices;

(b) issuing interrupt requests from the peripheral I/O devices to an interrupt control circuit as addresses in the reserved set of addresses on an address bus connecting the peripheral I/O devices and the interrupt control circuit;

(c) decoding the addresses at the interrupt control circuit to determine the requesting peripheral I/O device; and (d) issuing interrupt signals to the CPU by the interrupt control circuit in response to the decoded addresses;

wherein the interrupt control circuit comprises decoders and a conventional interrupt controller, and wherein the decoders provides specific interrupt control signals to the interrupt controller according to the addresses decoded, and the interrupt controller interrupts the CPU.

2. A method for issuing and processing interrupt requests in a computer having a central processing unit (CPU) and peripheral I/O devices comprising steps of:

(a) reserving a set of addresses in the address space of the computer, individual ones of the reserved addresses representing individual ones of the peripheral devices;

(b) issuing interrupt requests from the peripheral I/O devices to an interrupt control circuit as addresses in the reserved set of addresses on an address bus connecting the peripheral I/O devices and the interrupt control circuit;

(c) decoding the addresses at the interrupt control circuit to determine the requesting peripheral I/O device; and (d) issuing interrupt signals to the CPU by the interrupt control circuit in response to the decoded addresses;

(e) issuing an acknowledge signal to the interrupt controller by the CPU in response to the interrupts issued by the interrupt controller; and (f) vectoring the CPU to interrupt service routines particular to the decoded interrupts by the interrupt controller in response to the acknowledge signals issued by the CPU.

* * * * *